Patented Apr. 3, 1951

2,547,728

UNITED STATES PATENT OFFICE 2,547,728

WATER REPELLENT COMPOSITIONS FOR TEXTILES

Ellis Abrams, Philadelphia, Pa., assignor to Quaker Chemical Products Corporation, Conshohocken, Pa., a corporation of Pennsylvania No Drawing. Application October 4, 1948, Serial No. 52,779

13 Claims. (Cl. 260—32.6)

This invention relates to compositions and processes for imparting durable water repellent finishes to textile materials and includes textile materials so treated which are highly resistant to wet scouring operations and to dry cleaning treatments.

Details and advantages of the invention will be apparent from the following detailed description of the invention.

I have found that high melting hydrophobic waxes in combination with a urea and/or melamine formaldehyde resins give a high degree of durable water repellency when applied to textile fabrics such as cotton, wool, silk or the like.

My Patent 2,446,864, August 10, 1948, covers the use of high molecular weight mono or di alkyl ureas suitable as a hydrophobic wax. These ureas all have melting points in the range 100–110° C. I have found now that the use of still higher melting waxes imparts a higher degree of permanence to the water repellent finish. This invention is concerned with the use of a diamide having the formula

wherein R and R' are saturated open chain hydrocarbon radicals, R having at least six carbon atoms and R' at least twelve. A specific diamide suitable for my invention for example is hexamethylene distearamide which can be mixed with other suitable hydrophobic waxes or can be used alone if desired in a suitable vehicle. Because of the high melting point (140°–145° C.) of the diamides, such as hexamethylene distearamide, it is extremely difficult to replace all the substituted urea so that a satisfactory emulsion will be produced. I have found that for practical purposes about 30 to 50 percent by weight of the substituted urea can be replaced by the hexamethylene distearamide. Such a mixture yields a satisfactory emulsion and provides a water repellent finish which is even more durable than the products disclosed in my aforementioned patent.

The diamides suitable for use in my composition are produced by reacting a diamine of the formula NH₂—R—NH₂ with a compound of the formula R'—CO—Q, R and R' being saturated open chain hydrocarbon radicals (R having at least six carbon atoms and R' at least 12), and Q being a radical whose hydride QH is miscible with water. Specific amines suitable for the reaction are 2,5-diaminohexane, 1,4-diamino-2-methylpentane, heptamethylenediamine, octamethylenediamine, 2,5-diamino-2,5-diamethyl-hexane, nonamethylenediamine, 2,6-diamino-2,6-dimethylheptane, decamethylenediamine, dodecamethylenediamine and undecamethylenediamine. Specific acids having 12 or more carbon atoms that are suitable for reacting with the amines include 2-n-amylnonanoic, heptadecanoic, behenic, cerotic, montanic, melissic, myristic, tridecanoic, palmitic, stearic, lauric, margaric, nondecanoic and arachidic acids, and mixtures of acids derived from hydrogenated fats and oils. Among the amide-forming derivatives of the acid, which may be used instead of the free acid, are the following: a-monolaurin, tridecylic amide, myristic anhydride, myricylpalmitate, tristearin, ethyl behenate, and melissic acid chloride.

I have found hexamethylene distearamide particularly suitable for use in my composition as the wax component which can be mixed with other suitable hydrophobic waxes or used alone if desired as previously explained. This compound is made by reacting hexamethylenediamine and stearic acid to yield a white crystalline solid having a melting point about 140° C.

Suitable substituted ureas for use in my composition are those having the formula

where R represents a saturated or unsaturated aliphatic radical containing 12 or more carbon atoms and R₁ represents either a hydrogen atom, or a saturated or unsaturated aliphatic radical containing one or more carbon atoms, or an aromatic or substituted aromatic radical. Such compounds include dodecyl urea, tetradecyl urea, octadecyl urea, octadecenyl urea, sym-di-dodecyl urea, sym-di-heptadecyl urea, sym-di-octadecyl urea, N-butyl-N'-hexadecyl urea, N-dodecyl-N'-octadecyl urea, N-phenyl-N'-octadecyl urea, N-(p-methyl phenyl)-N'-tetradecyl urea, and N-(p-phenyl phenyl)-N'-dodecyl urea among others.

Suitable amine or amide aldehyde resins for use in my composition are the amine or amide aldehyde resins (generally the intermediate stage resins) which are soluble in organic solvents and are of the type exemplified by the solvent soluble urea formaldehyde resins, urea acetaldehyde resins, urea crotonaldehyde resins, mixed urea melamine aldehyde resins; aniline formaldehyde resins, and other solvent soluble aniline aldehyde resins; guanidine formaldehyde resins, and other guanidine aldehyde resins; dicyandiamide formaldehyde resins and the like.

My composition containing the substituted urea, diamide, and amine or amide aldehyde resin may be applied to the textile fibers or fabrics either in the form of a solution in an organic solvent or in the form of an emulsion. The preferred manner of applying the composition is by means of an emulsion.

In accordance with one embodiment of the invention, my composition is dispersed in a mixture of an aromatic solvent and a polar solvent, together with a small proportion of an emulsifying agent to form a thick paste. Any type of emulsifier adapted to form an oil in water emulsion may be used, but I prefer to use emulsifying agents which decompose on heating to leave a hydrophobic residue. Suitable emulsifying agents include the reaction product of morpholine and oleic acid, or other higher fatty acids. Other volatile amines are ethylene diamine, dimethylethanolamine, propylenediamine, and pyridine. The utility of such emulsifying agents is based on the fact that the amine is volatile at the curing temperature of the water repellent finish and this volatile amine portion of the emulsified evaporates, thus decomposing the emulsifier and increasing the permanency of the finish.

The above described thick paste comprising the substituted urea, diamide, amine or amide aldehyde resin and solvent in emulsified form is particularly suitable for sale and shipment to a textile treating establishment. The user simply heats the paste with water until the paste is in a molten condition and forms the emulsion with agitation. Preferably a small proportion of ammonium hydroxide or other alkali is added to aid the formation of a suitable dispersion.

Various types of fabrics such as cotton, wool, or silk may be padded through the hot emulsion with the rolls adjusted so that a pickup equal to the weight of the cloth is obtained, or applied in any other manner to effect a similar deposit on the fabric. Preferably conditions are adjusted so that a dry pickup of 7–12% (depending on the fabric) is obtained. The fabric is then dried and heated at a temperature and time sufficient to cure the amine or amide formaldehyde resin, for example, from 120–170° C. from 3–10 minutes.

The baking or curing treatment is essential for the realization of permanent water repellent properties. Water repellent effects are apparent after baking for 10 minutes at 75° C., but best results are obtained when the curing range is 120–170° C. The duration of the baking treatment varies with the temperature and weight of fabric. Applications made in accordance with this invention enable the operator to obtain samples almost completely free of tendering. Fabrics treated in accordance with this invention may be cured without going through a careful preliminary drying stage, thus enabling higher running speeds and lower production costs. Also, in the case of the prior art use of quaternary salts it is necessary to give the treated fabrics a light scouring operation following the baking period. This is to remove residual salts and acid, and unreacted materials. This operation and the subsequent necessary drying operation are not necessary for materials treated according to the principles described.

Instead of using an emulsion, my composition may be dissolved in an organic solvent such as, for example, trichloroethylene, preferably containing a small proportion of acetic acid. Other suitable solvents are xylene, butanol, diethylene glycol monobutyl ether, ethylene glycol monobutyl ether, and the like. The warm solution is padded on the cloth or fiber which is then cured in the usual manner for curing the amine or amide aldehyde resin.

To more clearly set forth the practice in accordance with the invention and to more specifically point out the nature of the product and process contemplated thereby, several specific, illustrative examples are hereinafter set forth, it being understood that these examples illustrate embodiments which have given satisfactory results and are not intended to restrict the invention thereto.

The following is an illustrative composition made in accordance with my invention, the amounts being given by weight:

14.0% dioctodecyl urea
10.0% hexamethylene distearamide
50.0% xylene
6.0% butanol
11.2% solvent soluble type urea formaldehyde resin (50% solids)
4.8% oleic acid
2.4% morpholine
1.6% n.butyl phosphoric acid This composition is prepared by heating the dioctodecyl urea and the hexamethylene distearamide until they are molten and are homogeneously mixed at a temperature of say about 150° C. To the molten wax mixture the xylene and butanol is slowly added and stirred. The solvent soluble urea formaldehyde resin is added and the remaining ingredients are then added and stirred. On cooling, the mixture sets to a thick paste.

An emulsion of this composition is prepared by adding 15 parts of this paste to 50 parts of hot water and heating the mixture to 90–95° C. Thirty parts of cold water and 3 parts of commercial ammonia are added to the hot mixture with high speed agitation. A fairly stable emulsion is produced which may be used to treat various types of fabrics. For example, cotton sheeting was padded through the solution at 50° C. with the rolls adjusted so the cloth picked up its own weight of liquid. The fabric was then baked at 120–150° C. for several minutes. The water repellent finish then showed exceptional resistance to scouring and dry cleaning.

The composition for producing the thick paste for use in preparing the emulsion may be varied widely. In general, it is preferred to keep the composition within the following approximate ranges, the amounts being given in percentages by weight:

| | |
|---|---|
| Mixture of substituted urea and diamide (the diamide being 30 to 50% by weight of the mixture) | 15–40 |
| Solvent type amine or amide formaldehyde resin | 5–20 |
| Butanol | 10–35 |
| Xylene | 15–40 |
| Morpholine | 1–5 |
| Oleic acid | 2–15 |

Other solvents may be substituted for xylene such as benzene, toluene, and certain commercial aliphatic-aromatic fractions recovered by the petroleum industry and boiling over the range 100–200° C.; such solvents are Solvesso Nos. 2 and 3, and Apcosol.

The use of a polar solvent such as butanol is necessary for a fluid emulsion. Ethylene glycol monoethyl ether, diethylene glycol monoethyl ether, 2-methyl-2,4-pentanediol, etc., may be used. In the absence of the polar solvent a thick viscous water in oil emulsion is obtained.

A typical solvent application of my composition can be carried out using the following composition, the amounts being given by weights:

6.0% hexamethylene distearamide
3.0% solvent soluble type urea formaldehyde resin
0.4% n.butyl phosphoric acid
90.6% xylene The above ingredients are mixed and heated to 80 to 90° C. Textile materials may be padded through this solution and cured in the normal fashion.

While there have been shown and described certain embodiments of the invention, it is to be understood that it is capable of many modifications. Changes, therefore, may be made without departing from the spirit and scope of the invention as described in the appended claims, in which it is the intention to claim all novelty inherent in the invention as broadly as possible, in view of the prior art.

I claim:

1. A composition particularly adapted for rendering textile material water repellent comprising a substituted urea having the formula $RNH-CO-NHR_1$ where R represents an aliphatic hydrocarbon radical containing at least twelve carbon atoms and $R_1$ represents a substituent selected from the group consisting of hydrogen and hydrocarbon radical; a diamide of the formula $R'-CO-NH-R-NH-CO-R'$ where R and R' represent saturated open chain hydrocarbon radicals, R having at least six carbon atoms and R' at least 12; and a resin soluble in an organic solvent selected from the group consisting of urea aldehyde and melamine aldehyde condensation products.

2. A composition particularly adapted for rendering textile material water repellent comprising a substituted urea having the formula $RNH-CO-NHR_1$ where R represents an aliphatic hydrocarbon radical containing at least twelve carbon atoms and $R_1$ represents a substituent selected from the group consisting of hydrogen and hydrocarbon radical; hexamethylene distearamide; and a resin soluble in an organic solvent selected from the group consisting of urea aldehyde and melamine aldehyde condensation products.

3. A composition particularly adapted for rendering textile material water repellent comprising a substituted urea having the formula $RNH-CO-NHR_1$ where R represents an aliphatic hydrocarbon radical containing at least twelve carbon atoms and $R_1$ represents a substituent selected from the group consisting of hydrogen and a hydrocarbon radical; a diamide of the formula $R'-CO-NH-R-NH-CO-R'$ where R and R' represent saturated open chain hydrocarbon radicals, R having at least six carbon atoms and R' at least 12; and a resin soluble in an organic solvent selected from the group consisting of urea aldehyde and melamine aldehyde condensation products, the total substituted urea and diamide being present in greater proportion by weight than said resin.

4. A composition particularly adapted for rendering textile material water repellent comprising a mixture of a substituted urea having the formula $RNH-CO-NHR_1$ where R represents an aliphatic hydrocarbon radical containing at least twelve carbon atoms and $R_1$ represents a substituent selected from the group consisting of hydrogen and a hydrocarbon radical; a diamide of the formula $R'-CO-NH-R-NH-CO-R'$ where R and R' represent saturated open chain hydrocarbon radicals, R having at least six carbon atoms and R' at least 12; and a melamine formaldehyde resin.

5. A composition particularly adapted for rendering textile material water repellent comprising a mixture of a substituted urea having the formula $RNH-CO-NHR_1$ where R represents an aliphatic hydrocarbon radical containing at least twelve carbon atoms and $R_1$ represents a substituent selected from the group consisting of hydrogen and a hydrocarbon radical; a diamide of the formula $R'-CO-NH-R-NH-CO-R'$ where R and R' represent saturated open chain hydrocarbon radicals, R having at least six carbon atoms and R' at least 12; and a urea formaldehyde resin soluble in an organic solvent.

6. A composition of matter comprising a mixture of a substituted urea having the formula $RNH-CO-NHR_1$ where R represents an aliphatic hydrocarbon radical containing at least twelve carbon atoms and $R_1$ represents a substituent selected from the group consisting of hydrogen and a hydrocarbon radical; a diamide of the formula $R'-CO-NH-R-NH-CO-R'$ where R and R' represent saturated open chain hydrocarbon radicals, R having at least six carbon atoms and R' at least 12; a resin soluble in an organic solvent selected from the group consisting of urea aldehyde and melamine aldehyde condensation products, and an organic solvent for said resin.

7. A composition of matter comprising a mixture of a substituted urea having the formula $RNH-CO-NHR_1$ where R represents an aliphatic hydrocarbon radical containing at least twelve and not more than eighteen carbon atoms and $R_1$ represents a substituent selected from the group consisting of hydrogen and a hydrocarbon radical; a diamide of the formula $$RI-CO-NH-R-NH-CO-R'$$

where R and R' represent saturated open chain hydrocarbon radicals, R having at least six carbon atoms and R' at least 12; a resin soluble in an organic solvent selected from the group consisting of urea aldehyde and melamine aldehyde condensation products, and a water soluble organic solvent.

8. A composition of matter comprising a mixture of a substituted urea having the formula $RNH-CO-NHR_1$ where R represents an aliphatic hydrocarbon radical containing at least twelve carbon atoms and $R_1$ represents a substituent selected from the group consisting of hydrogen and a hydrocarbon radical; a diamide of the formula $R'-CO-NH-R-NH-CO-R'$ where R and R' represent saturated open chain hydrocarbon radicals, R having at least six carbon atoms and R' at least 12; a resin soluble in an organic solvent selected from the group consisting of urea aldehyde and melamine aldehyde condensation products, a hydrocarbon solvent, and a water soluble organic solvent.

9. A composition of matter comprising a mixture of a substituted urea having the formula $$RNH-CO-NHR_1$$

where R represents an aliphatic hydrocarbon radical containing at least twelve carbon atoms and $R_1$ represents a substituent selected from the group consisting of hydrogen and a hydrocarbon radical; a diamide of the formula

R'—CO—NH—R—NH—CO—R' where R and R' represent saturated open chain hydrocarbon radicals, R having at least six carbon atoms and R' at least 12; a resin soluble in an organic solvent selected from the group consisting of urea aldehyde and melamine aldehyde condensation products, a hydrocarbon solvent, a water soluble organic solvent and an emulsifying agent.

10. A composition particularly adapted for rendering textile material water repellent comprising a solution in a hydrocarbon solvent and a water soluble organic solvent of a substituted urea having the formula RNH—CO—NHR₁ where R represents an aliphatic hydrocarbon radical containing at least twelve and not more than eighteen carbon atoms, and R₁ represents a substituent selected from the group consisting of hydrogen and hydrocarbon radicals; a diamide of the formula R'—CO—NH—R—NH—CO—R' where R and R' represent saturated open chain hydrocarbon radicals, R having at least six carbon atoms and R' at least 12; and an organic solvent soluble urea aldehyde resin.

11. A composition particularly adapted for rendering textile material water repellent comprising a solution in a hydrocarbon solvent and a water soluble organic solvent of a substituted urea having the formula RNH—CO—NHR₁ where R represents an aliphatic hydrocarbon radical containing at least twelve carbon atoms and R₁ represents a substituent selected from the group consisting of hydrogen and hydrocarbon radicals; a diamide of the formula

R'—CO—NH—R—NH—CO—R' where R and R' represent saturated open chain hydrocarbon radicals, R having at least six carbon atoms and R' at least 12; and urea formaldehyde condensation product soluble in an organic solvent, the total substituted urea and diamide being present in greater proportion by weight than said urea formaldehyde.

12. A textile material having a water repellent finish comprising a substituted urea having the formula RNH—CO—NHR₁ where R represents an aliphatic hydrocarbon radical containing at least twelve carbon atoms and R₁ represents a substituent selected from the group consisting of hydrogen and a hydrocarbon radical; a diamide of the formula R'—CO—NH—R—NH—CO—R' where R and R' represent saturated open chain hydrocarbon radicals, R having at least six carbon atoms and R' at least 12; and a resin soluble in an organic solvent selected from the group consisting of urea aldehyde and melamine aldehyde condensation products.

13. The process of rendering textile material water repellent which comprises impregnating textile material in a fluid comprising a substituted urea having the formula RNH—CO—NHR₁ where R represents an aliphatic hydrocarbon radical containing at least twelve carbon atoms and R₁ represents a substituent selected from the group consisting of hydrogen and a hydrocarbon radical; a diamide of the formula

R'—CO—NH—R—NH—CO—R' where R and R' represent saturated open chain hydrocarbon radicals, R having at least six carbon atoms and R' at least 12; and a resin soluble in an organic solvent selected from the group consisting of urea aldehyde and melamine aldehyde condensation products, and curing the said resin.

ELLIS ABRAMS.

REFERENCES CITED

The following references are of record in the file of this patent:

UNITED STATES PATENTS

| Number | Name | Date |
| --- | --- | --- |
| 2,132,388 | Berchet | Oct. 11, 1938 |
| 2,344,926 | Thackston et al. | Mar. 21, 1944 |
| 2,446,864 | Abrams | Aug. 10, 1948 |